United States Patent [19]
Krinke

[11] 3,764,797
[45] Oct. 9, 1973

[54] VEHICLE HEADLIGHT
[75] Inventor: Harlan L. Krinke, May Twp., Cty. of Washington, Minn.
[73] Assignee: Minnesota Mining and Manufacturing Company, St. Paul, Minn.
[22] Filed: Apr. 27, 1972
[21] Appl. No.: 247,960

[52] U.S. Cl..... 240/7.1, 240/41.35 D, 240/41.35 R, 240/41.36
[51] Int. Cl. .................................................. F21m
[58] Field of Search.............. 240/41.35 D, 41.35 R, 240/41.36

[56] References Cited
UNITED STATES PATENTS
1,547,757   7/1925   Johnson ...................... 240/41.35 D
1,814,328   7/1931   Oestnaes ........................ 240/41.36

FOREIGN PATENTS OR APPLICATIONS
1,537,728   7/1968   France ......................... 240/41.35 R
1,545,880   10/1968  France ......................... 240/41.35 R
1,149,920   4/1969   Great Britain Primary Examiner—Samuel S. Matthews
Assistant Examiner—Michael D. Harris
Attorney—Kinney, Alexander, Sell, Steldt & Delahunt

[57] ABSTRACT

A vehicle headlight has a condensing lens in its front portion. At the rear, the reflector has a sausage-shaped cavity with the lamp positioned therein. A shield is positioned at the lower lefthand side of the headlight to reduce light to the oncoming land of traffic.

7 Claims, 9 Drawing Figures

VEHICLE HEADLIGHT

BACKGROUND OF THE INVENTION

The present invention relates to a novel vehicle headlight which directs an image of the filament down the driving lane to provide high intensity illumination of the driving lane and which projects an image of a light diffuse programmed cavity surrounding the lamp over adjacent portions of the roadway. In one aspect the present invention relates to an improved vehicular headlight for use during high speed freeway, turnpike and divided highway night driving.

The present invention provides a vehicle headlamp which projects light of varying intensity and which controls the area covered by said light such that the high intense light is directed straight down the path of the vehicle and that the light of lower intensity is projected peripherally in a controlled pattern to avoid glare for oncoming motorists.

DISCUSSION OF THE PRIOR ART

A major safety hazard exists with the presently commercial vehicle headlamps. This hazard exists for two reasons. The first reason is that with the increased speed limits permitted on freeways, turnpikes and other divided interstate highways, the driver is presently overdriving his headlamps. The speeds recommended on most freeways for night driving are between 65 miles per hour and 75 miles per hour. The distance required to stop at 65 miles per hour is 435 feet; the distance required to stop at 70 miles per hour is 535 feet; and the distance required to stop at 75 miles per hour is 670 feet. The conventional high beams for vehicle headlamps have been accepted as adequate illumination for speeds no greater than 55 miles per hour. At 55 miles per hour the automobile requires a stopping distance of 290 feet. The bright spot or maximum initial candle power from conventional high beams is 37,000. This bright spot when projected a distance of 290 feet has an intensity of approximately 0.5 foot candles. These figures will thus show that it is necessary to increase the intensity of headlamps. As the intensity of headlamps increases however this will also increase the glare to the oncoming motorist. Blinding of the oncoming motorist is the second reason the conventional vehicle headlights are a hazard.

Many attempts have been made to improve the headlights and reduce the glare for oncoming motorists, and examples of the prior devices for solving this problem besides the conventional two-state or binary system which has two discrete states of operation designated as "high beam" and "low beam" using a pair of filaments, includes U.S. Pat. No. 3,341,700. This U.S. patent discusses prior art using a vane disposed in the lamp to completely block out light which may be directed by the lens toward the oncoming motorist's lane and a vane which is only partially transmissive such that there is not a sharp frontal shadow edge between the visible light and the dark as one looks at the oncoming vehicle or as one sits in the vehicle equipped with such lights and sees a sharp side edge rather than a gradual shadowing or change from light to dark. Other prior art relating to vehicle headlamps is the application of Raymond H. Anderson, Ser. No. 68,115, filed Aug. 31, 1970, and assigned to the assignee of this application. In this earlier application the lens of the vehicle headlight is focussed on a roundel which provides diffuse illumination to said lens from a source positioned rearwardly of the roundel. A portion of the roundel is masked by a filter or has less transmissiveness than the remaining portions of the roundel such that the intensity of the light is substantially reduced in one portion of the projected beam.

In these prior art constructions some light is lost because of the diffuser or when the light source is focussed to a focal point of the headlight lens the light output from the face of the headlamp is generally uniform over the face of the lamp and is uniform in the projected beam. Blocking the projected light from said focal point to shield the other driver and by a moving vane operated by the driver or remotely by a light detector does not solve the intensity problem or give full protection to oncoming motorists.

Thus it is believed that the prior art fails to meet the total objective of increasing safety by providing better illumination farther down the road for the driver of one automobile and at the same time assuring protection for the oncoming motorists from glare from the headlamps.

SUMMARY OF THE PRESENT INVENTION

The present invention has an advantage over the previously known devices in that no movable parts are required to provide protection for the oncoming motorist and yet the headlight provides sufficient illumination for the driver. It is not necessary that two filaments be utilized to help reduce the glare to the oncoming motorists or that a driver make an adjustment in response to a judgment decision.

The present invention related to vehicle headlamps provides a high intense driving beam for the driver to see a safe distance up the road, enough peripheral light to clearly illuminate overhead and road side road signs, and one which will present a dimmed light to the oncoming motorist as he approaches the vehicle equipped with these lamps so as to permit the oncoming motorist to know the position of the oncoming vehicle but yet not be blinded by the glare of these headlamps.

The vehicle headlight of the present invention comprises a housing with a condensing lens mounted in the forward end of the housing and a source of illumination mounted in the rearward end of the housing. The housing may be conical in shape with the lens positioned in the larger forward end. The source of illumination comprises a filament disposed centrally in a first surface circular diffuse reflector. The diffuse reflector has a programmed cavity surrounding the filament. The cavity opening is positioned at the focal surface of the lens and the cavity in front elevation is generally allantoic with the filament disposed centrally along a generally vertical center line. An arc of the cavity extends from the upper lefthand quadrant toward the center and up into the upper righthand quadrant generally symmetrically. The filament is mounted at the focus of the lens and the diffuse reflector provides a pattern of projected light with the image of the filament, or other equivalent light source or generating means, projected forwardly of the headlight along the optic axis of the same. The programmed cavity provides peripheral illumination at various intensities over an irregular pattern. Means are provided for control of the light from the lower lefthand quadrant when looking at the illumination source in front elevation.

DESCRIPTION OF THE DRAWING

The present invention will be more fully described in the following detailed description which refers to the accompanying drawing wherein.

Figure 1:
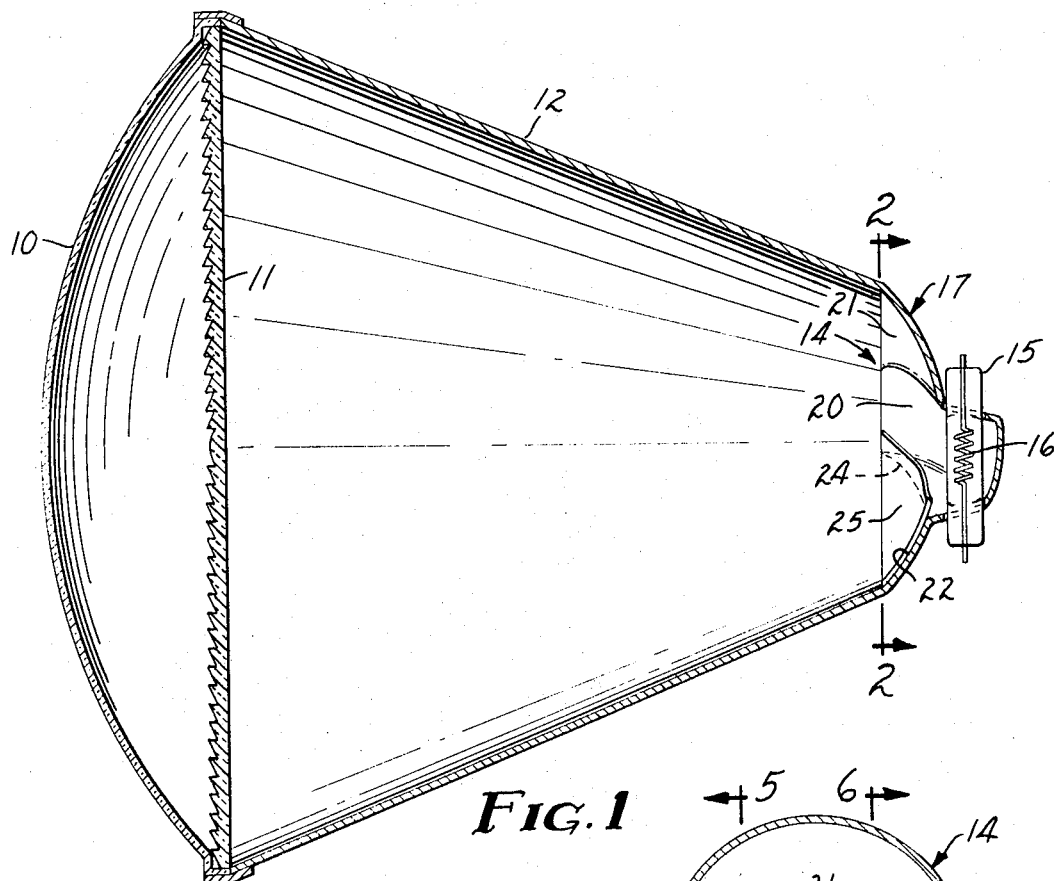
FIG. 1 is a longitudinal sectional view of a vehicle headlight constructed according to the present invention.

The vehicle headlight as illustrated in FIG. 1 comprises a spherical-shaped cover 10 formed of glass or other transparent material, a condensing lens 11, a housing 12 with the cover and condensing lens supported at the forward end, and a source 14 of illumination comprising a lamp 15 having a filament 16 and a programmed diffuse reflector means. Housing 12 is generally conical-shaped with the reflector 17 disposed at the rear end thereof.

The lamp 15 may be a quartz iodine lamp disposed with the filament 16 extending in a vertical plane through the reflector 17. In a preferred embodiment the filament 16 is about 0.26 inch long and has a helical configuration with a diameter of about 0.18 inch. The lamp has a color temperature of 3,200° K with a maximum candle power of 125,000.

The condensing lens 11 is a Fresnel-type lens and has the focal length of about 4.84 inches and the filament 16 of the light source is disposed at the focus of the lens. The lens also has an object distance of about 4.84 inches and an image distance of infinity, where magnification at 600 feet is determined as follows:

Magnification = (600)(12) tan 1°/0.09 = 1400

The image of the filament at 600 feet would then be 21 feet wide.

Referring now to FIGS. 2 through 6, the reflector 17 is shown in sufficient detail that one may be able to reconstruct the shape of a cavity 20 therein which is programmed to distribute light of varying intensity about the axis of the intense spot or beam of light projected on axis of the headlight from the filament.

Figure 2:
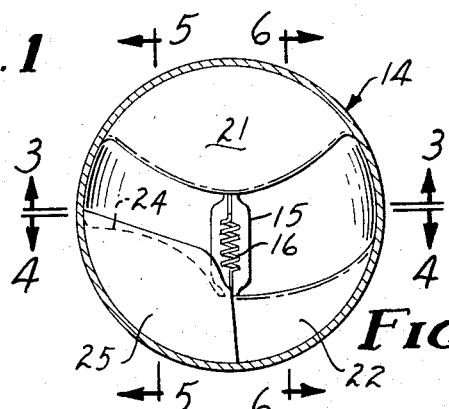
FIG. 2 is a vertical sectional view taken along line 2—2 of FIG. 1.
Figure 3:
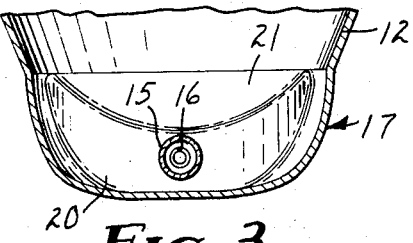
FIGS. 3, 4, 5 and 6 are sectional views taken along the respective section lines 3—3, 4—4, 5—5 and 6—6.
Figure 4:
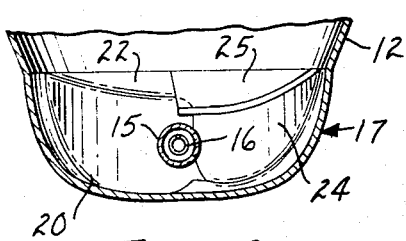
Figure 5:
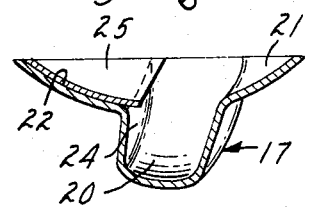
Figure 6:
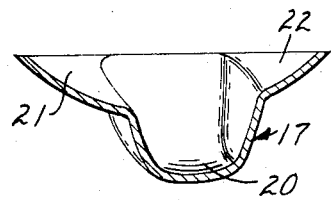

In FIG. 2 the cavity 20 is shown in front elevation and the cavity is generally allantoic or sausage-shaped and is a deep cavity having an arcuate configuration and a rather short vertical dimension. The open end of the cavity is disposed at the focal surface of the lens which is a curved plane, for the lens used, having a radius of about 2 inches and a diameter or transverse dimension of about 2.8 inches. The focal surface, as shown defines two dish-shaped areas 21 and 22 above and below the reflective cavity 20. The cavity 20 and areas 21 and 22 are preferably coated with a diffuse reflecting material, i.e., magnesium oxide, to afford light diffuse reflecting areas each of which may be image points projected through all areas of the lens 11. The cavity 20 has the lamp 15 disposed therein in a generally vertical position with the filament 16 in a vertical plane through the lens and cavity as shown in FIGS. 1 and 2.

The reflector 17 is provided with means for controlling light from the cavity 20 in the lower lefthand quadrant of said reflector as shown in FIG. 2. This means for controlling light may be a projecting lip from a convex side wall 24 in the lower lefthand quadrant of the reflector member or there may, for convenience in manufacture, be a shield 25 disposed over a portion of the area 22 and of the cavity 20 in an area in the lower lefthand quadrant as the reflector 17 is viewed in front elevation. The face of the shield is painted with a very flat black paint affording such low reflectivity that it is not a surface from which any illumination is received. The convex wall 24 projects into the cavity to reduce the amount of light blocked and not redirected by the shield 25 and thus heat buildup is reduced. The shield 25 however blocks the light in the lower lefthand quadrant or controls the intensity of the light in that area to avoid any bright illumination emanating from this area of the reflector. The light distribution from the rest of the cavity is precisely controlled by the design of the cavity.

Referring to FIG. 2, the upper arcuate wall of the cavity has a radius of about 1.2 inches from a point 1.4 inches above the midpoint or a point on the optic axis of the lens 11. The cavity has a width in the vertical plane through the axis of about 0.9 inch, the wall 24 is defined by a radius of about one inch from a center positioned about 1.03 or 1.05 inches from each of the two coordinates through the reflector center. The rearward wall of the cavity is radiused in the vertical and horizontal plane and the depth of the cavity from the focal surface is about one-half (0.5) inch. The walls of the cavity have an incline of 5° to 20° with a line parallel to the optic axis. The cavity produces a light pattern having light of less than 2,000 candlepower visible at any time to the oncoming motorist after he has moved 4° to 6° to the left of the axes of the headlight of this invention, while at the same time maintaining the same adequate illumination of the driving lane of the vehicle having the headlight to a distance of more than twice that of the conventional headlight. The headlight of the present invention is much more efficient since the filament is at the lens focus as in a spot light and the light pattern from the lamp and cavity is projected as illustrated on a vertical chart in FIG. 7 and on a horizontal chart in FIG. 8.

Figure 7:
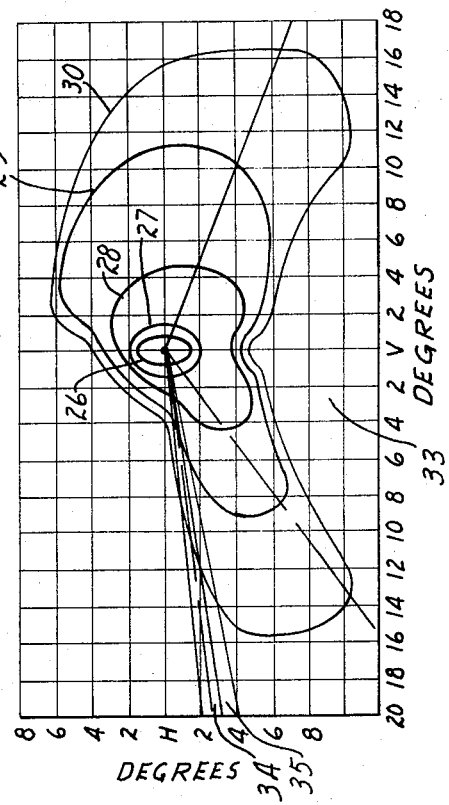
FIG. 7 is a graph showing isocandle curves of light illumination from a lamp according to the present invention superimposed on a picture of a four lane divided roadway.
Figure 8:
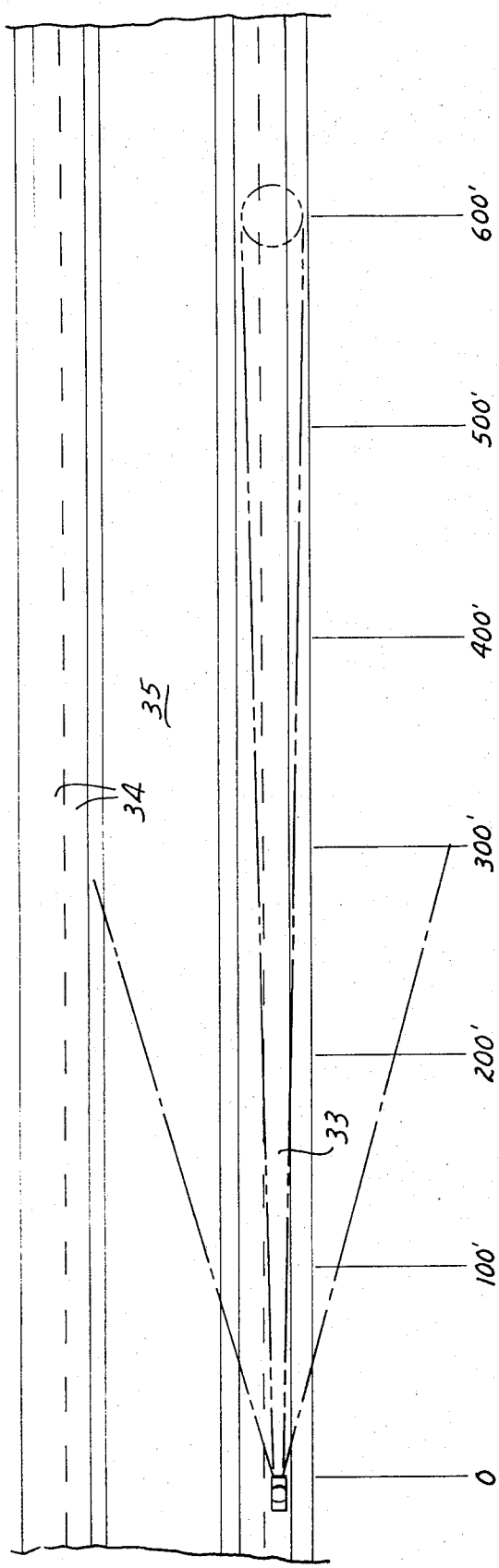
FIG. 8 is a schematic plan view of a roadway on a graph showing the pattern of light from vehicles equipped with the headlights of the present invention.

In FIG. 7 isocandle curves are plotted onto a picture of a roadway to illustrate the varying intensity of the light pattern and the position of the intense light on a roadway. The light beam is projected straight down the driving lane 33 toward infinity with the curve 26 indicating the area having an intensity of 100,000 candlepower. The curve 26 has a small size and must be aligned with the vertical and the horizontal planes through the lamp and directed at a spot straight down the road. Extending about this curve are further curves 27, 28, 29 and 30 indicating respectfully areas of 20,000 candlepower; 5,000 candlepower; 2,000 candlepower; and 1,000 candlepower. Thus, an oncoming motorist in a lane 34 at 10° to 16° on the lefthand side of the vehicle and approximately 600 feet away from the light would be exposed to the portion of the lamp having an output of less than 2,000 candlepower and at that distance would see a dim light. At 300 feet away the oncoming vehicle is approximately 18° to the left of the lamp, on a typical four lane divided freeway with 12 foot lanes, with a 60 foot median 35 and with 84 feet between centerlines, and would see substantially no light. The headlamp of the present invention as seen in FIG. 8 has a high intensity between 0° and 2° from the axis of the headlamp and beyond 4° left of the axis the lamp corresponds quite generally to the brightness of a low beam conventional lamp, i.e., 2,000 candlepower. This is all accomplished without any electrical switching or mechanical movements within the headlight which effect a change in the useful light for the driver to effect a change in the glare protection for the oncoming motorist.

Figure 9:
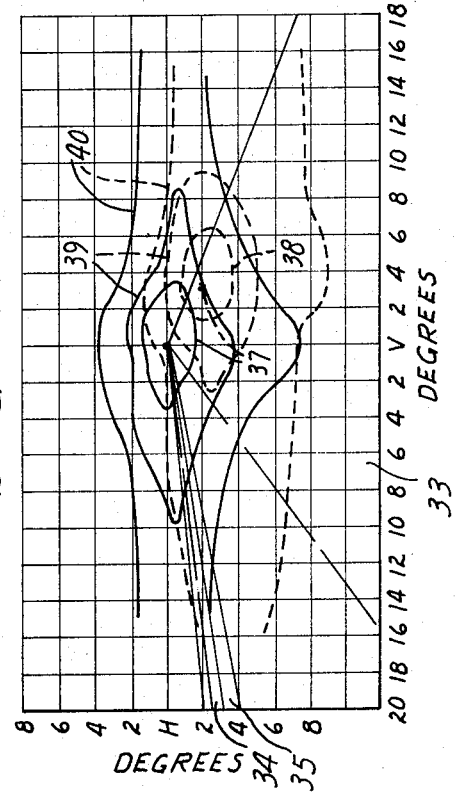
FIG. 9 is a schematic plan view of a roadway on a graph showing the pattern of conventional headlamps having two filaments, one for "high beam" and one for "low beam" and sold by General Motors Corporation as Guide Power Beam lamps of the 6000 series.

In FIG. 9, the comparable isocandle curves for a conventional Guide Power Beam lamp No. 6014 (50 watts, 13 volts) is shown with the high beam (solid lines) and low beam (broken lines) overlayed. The center at the point of intersection of the horizontal and vertical planes has an intensity at high beam of 38,000 candlepower, lines 37 indicate an intensity of 20,000 candlepower, lines 38 of 10,000 candlepower, lines 39 of 5,000 candlepower and lines 40 of 1,000 candlepower. A comparison of FIGS. 7 and 9 will readily indicate the improved safety performance of the light of the present invention wherein levels of light equal to below that of the "low beam" is directed toward an oncoming motorist and a bright driving light is available to the driver.

I claim:

1. A vehicle headlight comprising a housing, a condensing lens mounted forwardly within said housing and a source of illumination mounted rearwardly within said housing, said source comprising a first surface diffuse reflector means comprising wall members defining a generally allantoic cavity which is positioned to open forwardly with its center point disposed below the optic axis of the lens and with an arc thereof extending from the upper lefthand quadrant toward the center and then up into the upper righthand quadrant area as seen in front elevation, a filament positioned within said cavity below said arc and at the focus of said lens, and means for reducing light reflection from said cavity in the lower lefthand quadrant area of said reflector means as seen in front elevation.

2. A vehicle headlight according to claim 1 wherein said opening of said cavity is disposed along the focal surface of said lens.

3. A vehicle headlight according to claim 1 wherein said reflector means is generally circular and has a concave forward face, the curvature of which corresponds to the focal surface of the lens with the cavity extending rearwardly of said surface.

4. The vehicle headlight according to claim 3 wherein said means for reducing light reflection includes a shield having a very low reflectivity positioned over the lower lefthand quadrant area of said reflector means.

5. A vehicle headlight according to claim 4 wherein said cavity has a convex wall disposed in the lower lefthand quadrant area to reflect light beneath said shield.

6. A vehicle headlight according to claim 1 wherein said means for reducing light reflection from said cavity has a rearwardly directed surface and said rearwardly directed surface provides specular reflection for reducing heat absorption.

7. A vehicle headlight according to claim 3 wherein the rearward facing surface of said shield is polished to afford specular reflection for reducing heat absorption.

* * * * *